United States Patent
Rosen et al.

(10) Patent No.: US 9,835,287 B2
(45) Date of Patent: Dec. 5, 2017

(54) SUPPORT BRACKET

(71) Applicant: Hamilton Sundstrand Corporation, Windsor Locks, CT (US)

(72) Inventors: Seth E. Rosen, Middletown, CT (US); Kenneth Crawford, Manchester, CT (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/993,506

(22) Filed: Jan. 12, 2016

(65) Prior Publication Data
US 2017/0198859 A1   Jul. 13, 2017

(51) Int. Cl.
*F16M 1/00*     (2006.01)
*F16M 13/02*    (2006.01)
*B64D 13/06*    (2006.01)

(52) U.S. Cl.
CPC .......... *F16M 13/02* (2013.01); *B64D 13/06* (2013.01); *B64D 2013/0603* (2013.01)

(58) Field of Classification Search
CPC ........ B64D 13/00; B64D 13/02; B64D 13/08; B64D 2013/0603; F16M 13/02; F04D 29/601; F04D 29/60
USPC .......................................... 248/309.1; 29/428
See application file for complete search history.

(56) References Cited

U.S. PATENT DOCUMENTS

| | | | |
|---|---|---|---|
| 9,175,696 B2 * | 11/2015 | Vignali | F04D 29/601 |
| 9,651,194 B1 * | 5/2017 | Rosen | F16M 13/02 |
| 2014/0346315 A1 * | 11/2014 | Mayo | B60H 1/00535 248/674 |
| 2014/0367543 A1 * | 12/2014 | Mayo | F16L 3/00 248/309.1 |

* cited by examiner

*Primary Examiner* — Todd M Epps
(74) *Attorney, Agent, or Firm* — Kinney & Lange, P.A.

(57) ABSTRACT

A support bracket includes a body, an arm, a first mount, a boss, and a second mount. The arm extends laterally from the body and a first fastener opening passes through the arm. The first mount extends from a first side of the body, and a first fillet is disposed at the interface of the first mount and the body. A boss extends from a second side of the body and a second fastener opening passes through the boss. A second fillet is disposed at the interface of the boss and the body. The second mount extends into the body opposite the boss. A third fillet is disposed at the interface of the second mount and the first side and a fourth fillet is disposed at the interface of the second mount and the second side.

20 Claims, 7 Drawing Sheets

SUPPORT BRACKET

BACKGROUND

The present disclosure relates generally to line replaceable units (LRU) for an aircraft environmental control system. More particularly, this disclosure relates to a support bracket for supporting multiple LRUs. An environmental control system utilizes various LRUs, such as cabin air compressors, heat exchangers, and manifolds, to condition air for delivery to an aircraft cabin. A backbone mount supports the various LRUs. The LRUs must be supported relative to one another to maintain the desired position of the LRUs. Supporting the LRUs in the desired position ensures that the various connections between and relative positions of the LRUs are maintained.

SUMMARY

According to an embodiment of the present disclosure, a support bracket includes a bracket body, a first mount, a boss, and a second mount. The bracket body includes a first side, a second side, a thickness T1 between the first side and the second side, an upper portion, and an arm extending laterally from the upper portion. The first mount extends perpendicularly from the first side and the upper portion. A first fillet is disposed at an interface of the first mount and the upper portion. The boss extends from the second side and the upper portion. A second fillet disposed at an interface of the boss and the second side. The second mount extending laterally into the upper portion. A third fillet is disposed at an interface of the second mount and the first side. A fourth fillet is disposed at an interface of the second mount and the second side.

According to another embodiment of the present disclosure, a support system includes a support bracket a cabin air compressor, a heat exchanger, a backbone mount, and a forward manifold. The support bracket includes a bracket body, the bracket body including a first side, a second side, a thickness T1 between the first side and the second side, an upper portion, and an arm extending laterally from the upper portion, wherein the arm includes a first fastener opening. The support bracket further includes a first mount extending from the first side and the upper portion, a first fillet disposed at an interface of the first mount and the upper portion, a boss extending from the second side and the upper portion, the boss including a second fastener opening extending through the boss, a second fillet disposed at an interface of the boss and the second side, a second mount extending laterally into the upper portion, the second mount including a slot, a third fillet disposed at an interface of the second mount and the first side, and a fourth fillet disposed at an interface of the second mount and the second side. A first tie-rod is attached to the cabin air compressor and secured within the first mount. A second tie-rod attached to the heat exchanger and secured within the slot of the second mount. A first fastener extends through the first fastener opening and into a backbone mount. A second fastener extending through the second fastener opening and into the forward manifold.

DETAILED DESCRIPTION

Figure 1:
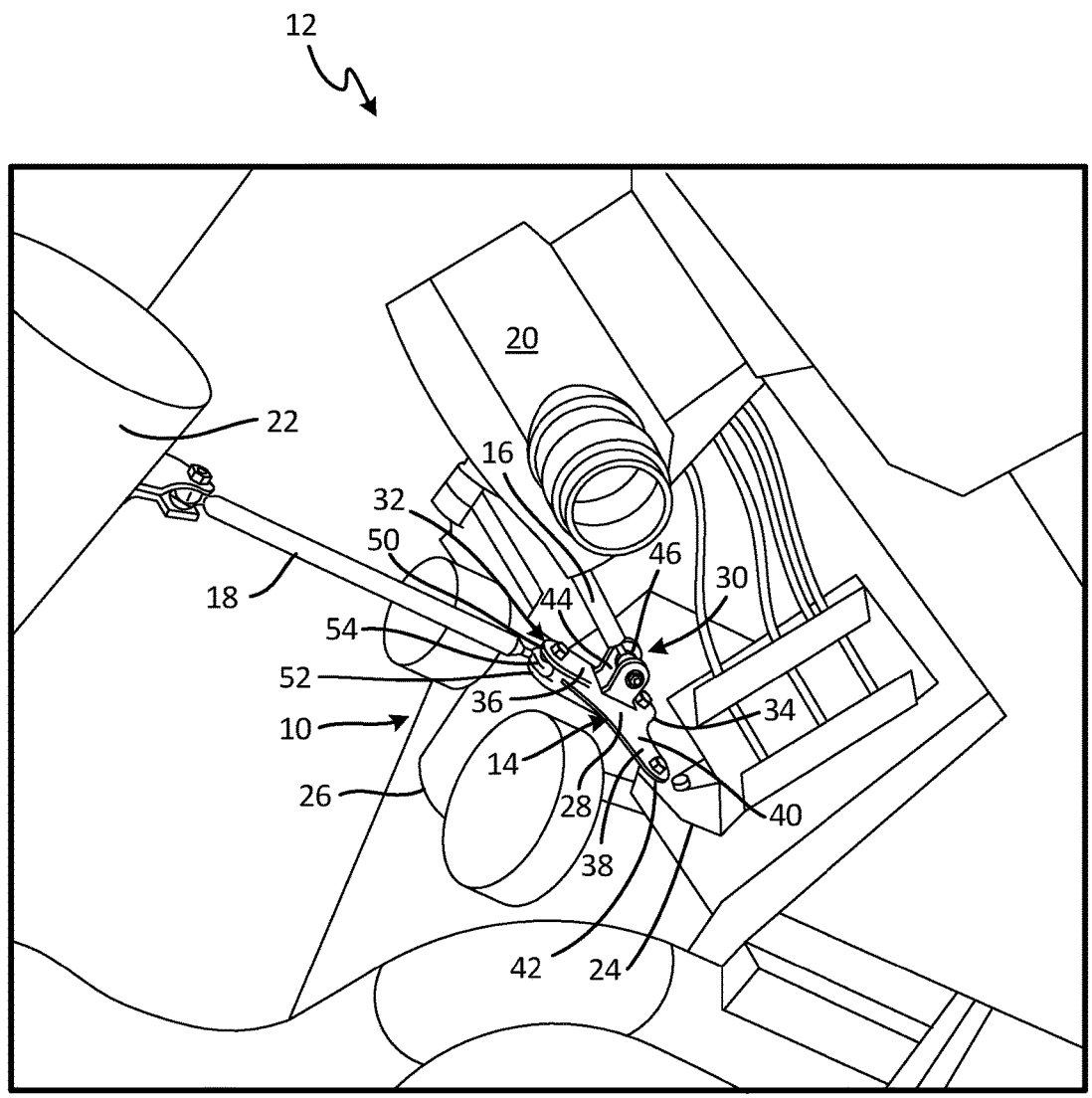
FIG. 1 is a perspective view of a support system for an aircraft environmental control system.

FIG. 1 is a perspective view of support system 10 for an environmental control system 12. Support system 10 includes support bracket 14, cabin air compressor (CAC) tie-rod 16, and heat exchanger (HX) tie-rod 18. Environmental control system 12 includes cabin air compressor (CAC) 20, heat exchanger 22, three-way lower mount 24, and forward manifold 26. Support bracket 14 includes body 28, first mount 30, second mount 32, and boss 34. Body 28 includes upper portion 36, arm 38, first side 40, and second side 42. First mount 30 includes inner portion 44, first arm 46, and second arm 48. Second mount 32 includes first portion 50, second portion 52, and slot 54.

First mount 30 is integral with body 28 and extends perpendicularly from first side 40 of body 28. Second mount 32 is similarly integrally attached to body 28, but second mount 32 extends laterally with regard to body 28. A portion of second mount 32 is attached to first side 40 and another portion of second mount 32 is attached to second side 42. Boss 34 is also integral with body 28, and boss 34 extends from second side 42 of body 28. Arm 38 extends from upper portion of body 28.

CAC 20, heat exchanger 22, and forward manifold 26 are all line replaceable units that condition air for use in the cabin of an aircraft. Three-way lower mount 24 forms a portion of a backbone support that supports environmental control system 12 and the various LRUs that comprise environmental control system 12. Support bracket 14 is connected to three-way lower mount 24, forward manifold 26, CAC tie-rod 16, and HX tie-rod 18. Support bracket 14 provides support to forward manifold 26, CAC 20, and heat exchanger 22, and support bracket 14 connects forward manifold 26, cabin air compressor 20, and heat exchanger 22 to three-way lower mount 24.

Arm 38 extends from upper portion 36 and includes a fastener opening passing through arm 38. Arm 38 is aligned with three-way lower mount 24 and a fastener passes through arm 38 and is received by three-way lower mount to secure support bracket 14 to three-way lower mount 24.

CAC tie-rod 16 is connected to CAC 20. CAC tie-rod 16 extends from CAC 20 and is received by first mount 30. CAC tie-rod 16 is received between first arm 46 and second arm 48. A fastener extends through first arm 46, second arm 48, and CAC tie-rod 16 to secure CAC tie-rod 16 to within first mount 30.

HX tie-rod 18 is connected to heat exchanger 22. Similar to CAC tie-rod 16, HX tie-rod 18 is received by second mount 32. HX tie-rod 18 extends from heat exchanger 22 and is received between first portion 50 and second portion 52 and within slot 54 of second mount 32. A fastener extends through first portion 50, HX tie-rod 18, and second portion 52 to secure HX tie-rod to second mount 32.

Boss 34 extends from second side 42 of body 28 and abuts forward manifold 26. A fastener extends through upper portion 36 and boss 34 and engages forward manifold 26. In this way, forward manifold 26 is secured to support bracket 14.

Support bracket 14 is connected to three-way lower mount 24 by a fastener extending through arm 38. Support bracket 14 is connected to CAC 20 by CAC tie-rod 16 being secured to both CAC 20 and first mount 30. Support bracket 14 is connected to heat exchanger 22 by HX tie-rod 18 extending between and being secured to heat exchanger 22 and second mount 32. Support bracket 14 is connected to forward manifold 26 by a fastener extending through boss 34 and engaging forward manifold 26. In this way, support bracket 14 is directly connected to both the backbone support of environmental control system at three-way lower mount 24, and support bracket 14 supports CAC 20, heat exchanger 22, and forward manifold 26.

Figure 2A:
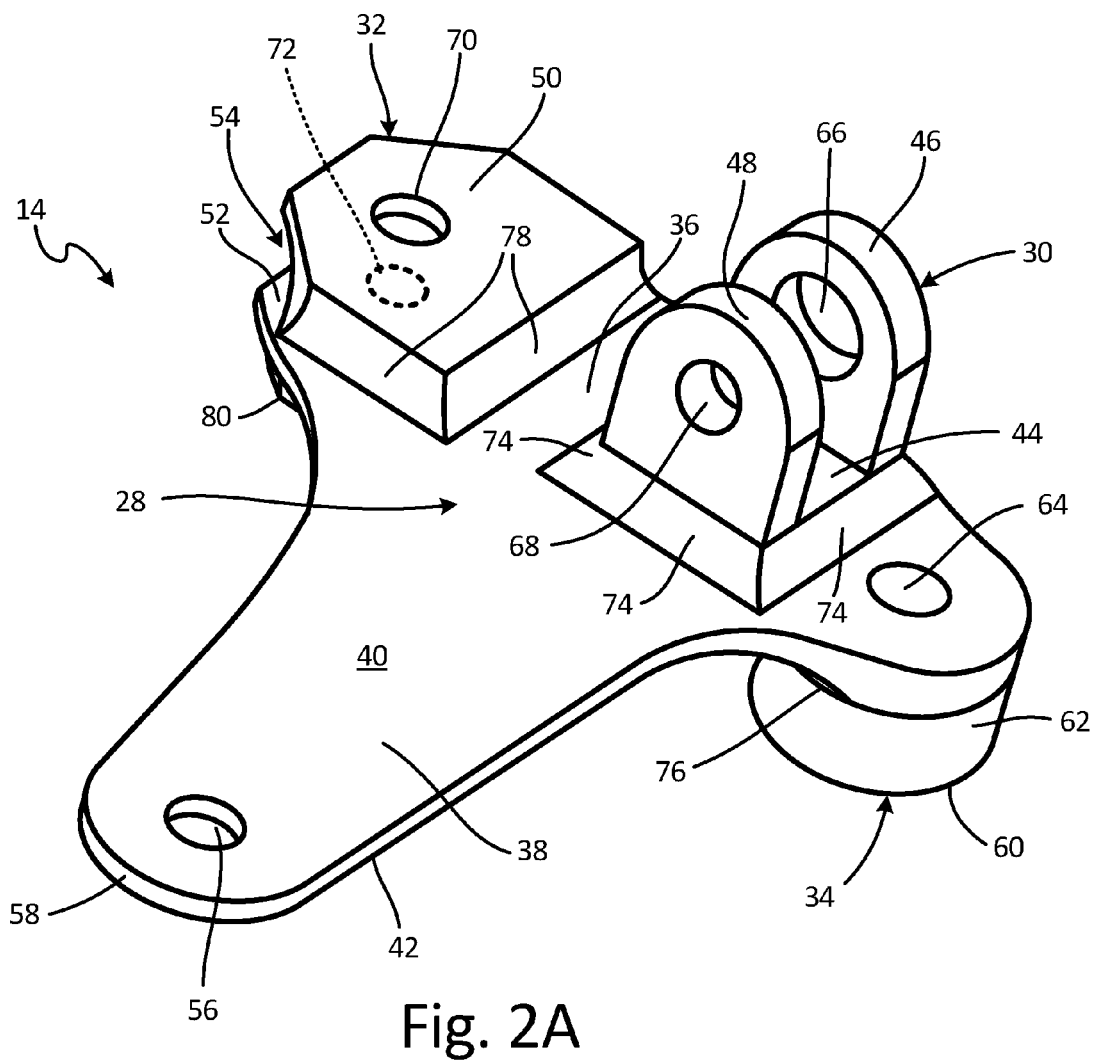
FIG. 2A is an isometric view of a support bracket.

FIG. 2A is an isometric view of support bracket 14. Support bracket 14 includes body 28, first mount 30, second mount 32, and boss 34. Body 28 includes upper portion 36, arm 38, first side 40, and second side 42. Arm 38 includes first fastener opening 56 and distal end 58. Boss 34 includes first end 60 and second end 62. Second fastener opening 64 passes through upper portion 36 and boss 34. First mount 30 includes inner portion 44, first arm 46, and second arm 48. First arm 46 includes third fastener opening 66 and second arm 48 includes fourth fastener opening 68. Second mount 32 includes first portion 50, second portion 52, and slot 54. Second mount 32 further includes fifth fastener opening 70 passing through first portion 50 and sixth fastener opening 72 passing through second portion 52.

Arm 38 is integral with and extends from upper portion 36. First fastener opening 56 extends through arm 38 between first side 40 and second side 42 near distal end 58 of arm 38. First mount 30 extends from first side 40 and is attached to upper portion 36 of body 28. Inner portion 44 of first mount 30 extends from first side 40. First fillet 74 is disposed at the interface between inner portion 44 and first side 40, such that first fillet 74 provides structural support to support bracket 14 at the connection of first mount 30 and upper portion 36. First arm 46 and second arm 48 extend from inner portion 44.

Boss 34 extends perpendicularly from second side 42 of body 28. Second fastener opening 64 extends through upper portion 36 and boss 34. Second fillet 76 is disposed at the interface between second end 62 of boss 34 and second side 42. Similar to first fillet 74, second fillet 76 provides structural support to support bracket 14 at the connection of boss 34 and upper portion 36.

Second mount 32 is integral with upper portion 36 and is disposed opposite boss 34 on upper portion 36. First portion 50 is offset from first side 40, and third fillet 78 is disposed at the interface between first portion 50 and first side 40. Similarly, second portion 52 is offset from second side 42 and fourth fillet 80 is disposed at the interface between second portion 52 and second side 42. Third fillet 78 provides structural strength to support bracket 14 at the interface of first portion 50 and first side 40 of upper portion 36. Fourth fillet 80 similarly provides structural strength to support bracket 14 at the interface of second portion 52 and second side 42 of upper portion 36. Slot 54 is disposed between and defined by first portion 50 and second portion 52. Slot 54 is configured to receive a connector, such as HX tie-rod 18 (shown in FIG. 1), to provide additional support to a unit, such as heat exchanger 22 (shown in FIG. 1), which is connected to support bracket 14 by the connector.

Fifth fastener opening 70 extends through first portion 50 and sixth fastener opening 72 extends through second portion 52. Fifth fastener opening 70 and sixth fastener opening 72 are aligned such that a fastener may pass through fifth fastener opening 70, slot 54, an object disposed within slot 54, such as HX tie-rod 18, and sixth fastener opening 72 to secure the object within slot 54.

Support bracket 14 is connected to various LRUs and provides support between the various LRUs and the backbone support structure of the environmental control system. Support bracket 14 supports the LRUs relative to each other and relative to the backbone support structure. First fillet 74 provides structural strength at the interface of first mount 30 and first side 40 of body 28. Second fillet 76 provides additional structural strength at the interface of boss 34 and second side 42 of body 28. Third fillet 78 provides structural strength at the interface of first portion 50 and first side 40 and fourth fillet 80 provide structural strength at the interface of second portion 52 and second side 42.

Figure 2B:
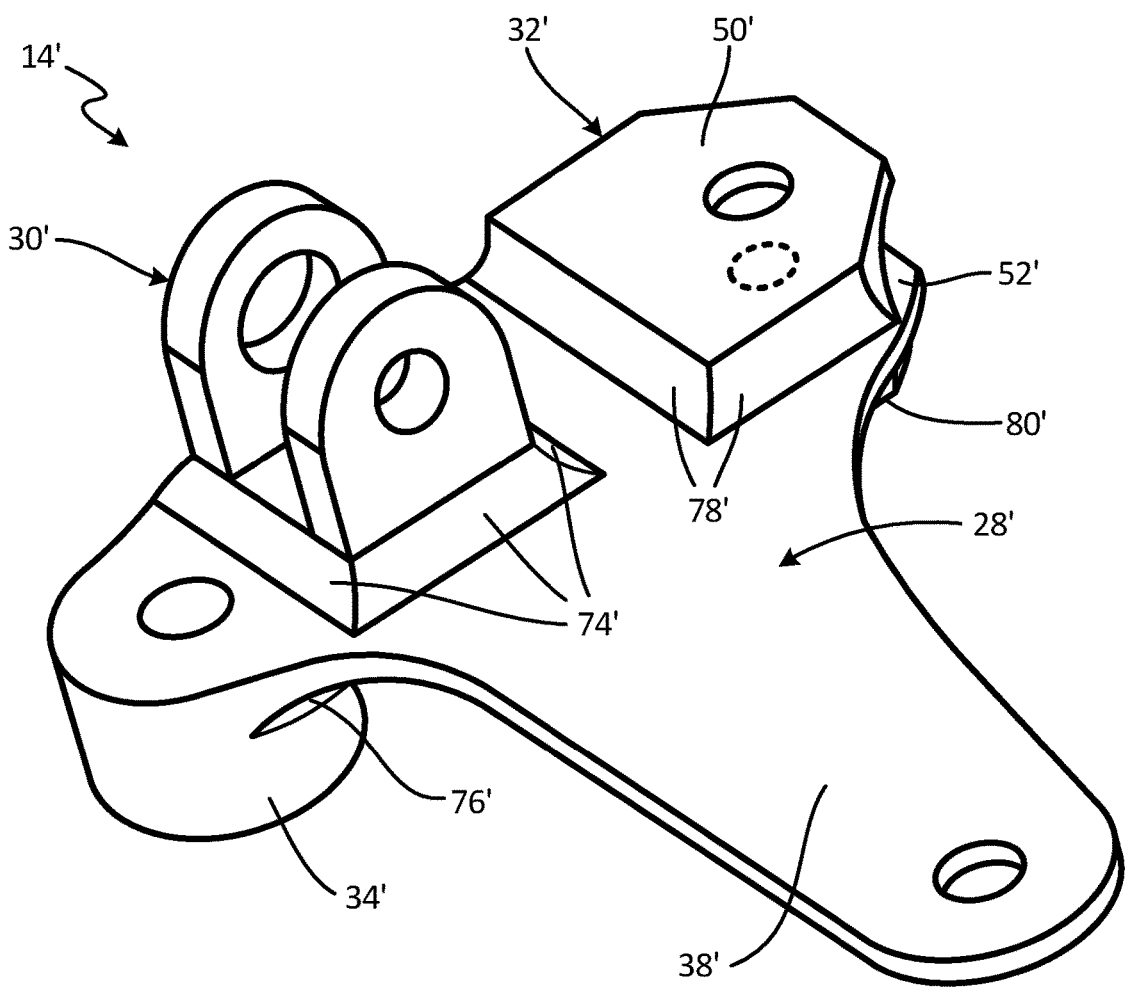
FIG. 2B is an isometric view of another embodiment of a support bracket.

FIG. 2B is an isometric view of support bracket 14'. Support bracket 14' is an alternate embodiment of support bracket 14, with support bracket 14' being a mirror image of support bracket 14. Support bracket 14' includes body 28', first mount 30', second mount 32', boss 34', and arm 38'. Second mount 32' includes first portion 50' and second portion 52'. Support bracket 14' includes first fillet 74' at an interface between first mount 30' and body 28'. Second fillet 76' is disposed at an interface between boss 34' and body 28'. Third fillet 78' is disposed at an interface between first portion 50' and body 28'. Fourth fillet 80' is disposed at an interface of second portion 52' and body 28'.

Support bracket 14' is a mirror-image of support bracket 14, such that support bracket 14' is configured to support LRUs for an environmental control system located at one side of an aircraft and support bracket 14 is configured to support LRUs for a mirrored environmental control system located on an opposite side of the aircraft. First fillet 74' provides structural support at the interface between first mount 30' and body 28'. Second fillet 76' provides structural support at the interface between boss 34' and body 28'. Third fillet 78' provides structural support at the interface between first portion 50' and body 28'. Fourth fillet 80' provides structural support at the interface between second portion 52' and body 28'. Each of first fillet 74', second fillet 76', third fillet 78', and fourth fillet 80' has a fillet radius configured such that support bracket 14' has adequate structural integrity to support multiple components with a single support bracket 14'.

Figure 3:
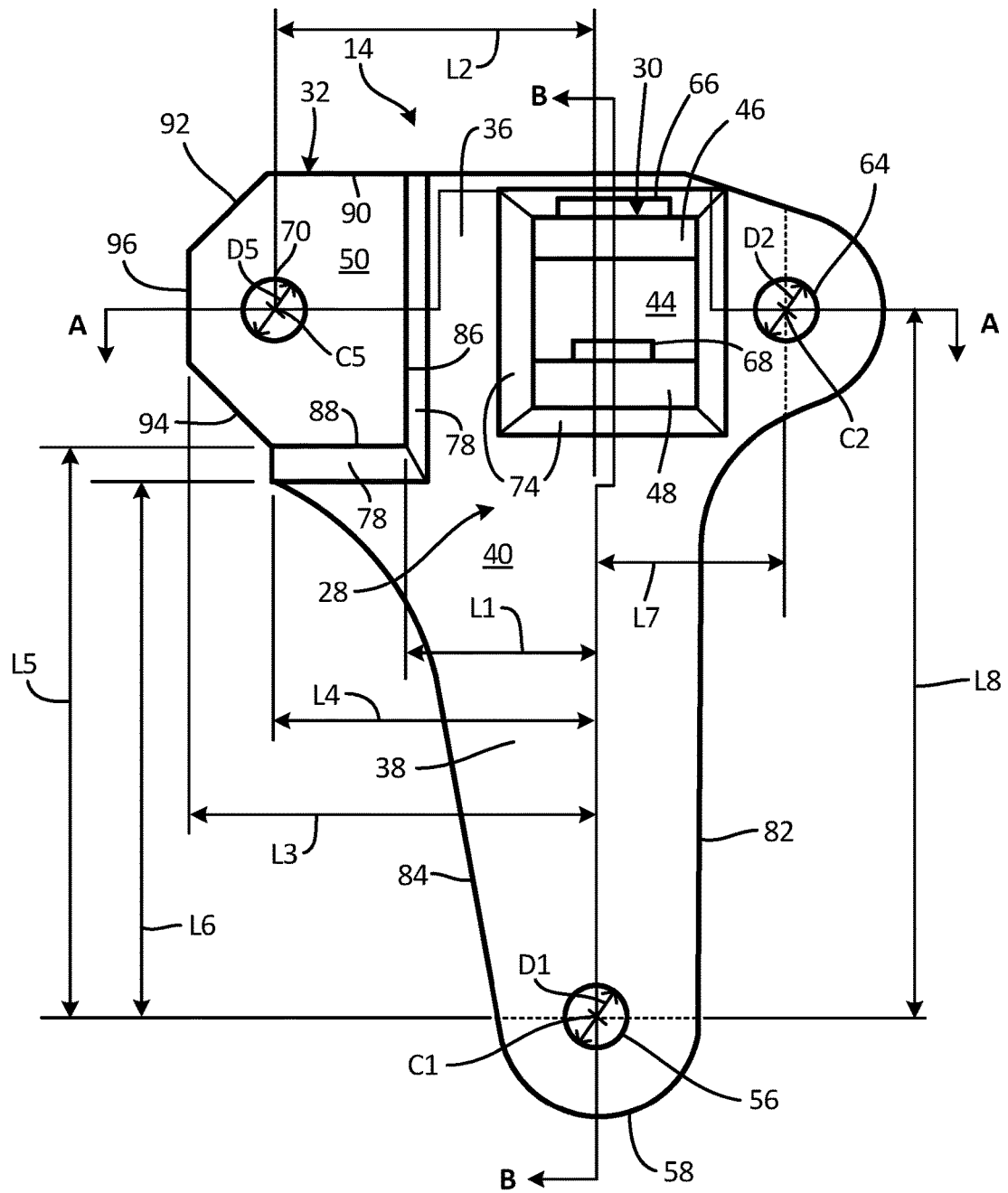
FIG. 3 is a plan view of a support bracket.

FIG. 3 is a top plan view of support bracket 14. Support bracket 14 includes body 28, first mount 30, second mount 32, and boss 34 (best seen in FIG. 2A). Upper portion 36, arm 38, and first side 40 of body 28 are shown. Arm 38 includes first fastener opening 56, flat edge 82, sloped edge 84, and distal end 58. First mount 30 includes inner portion 44, first arm 46, and second arm 48. First arm 46 includes third fastener opening 66 and second arm 48 includes fourth fastener opening 68. Second mount 32 includes first portion 50, second portion 52 (best seen in FIG. 4C), fifth fastener opening 70, and sixth fastener opening 72 (best seen in FIG. 2A). First portion 50 includes inner edge 86, first side edge 88, second side edge 90, first angled edge 92, second angled edge 94, and outer edge 96.

First mount 30 extends from first side 40 of body 28 perpendicular to upper portion 36. First fillet 74 is disposed at an interface between inner portion 44 and first side 40 of body 28. First arm 46 extends from inner portion 44 and second arm 48 also extends from inner portion 44. First arm 46 extends parallel to second arm 48. First arm 46 and second arm 48 define slot 54, and slot 54 is configured to receive a connector, such as CAC tie-rod 16. Third fastener opening 66 extends through first arm 46 and fourth fastener opening 68 extends through second arm 48. Third fastener opening 66 is aligned with fourth fastener opening 68 such that a fastener may pass through third fastener opening 66, the connector, and fourth fastener opening 68 to secure the connector to first mount 30.

Arm 38 is integrally attached to upper portion 36 such that arm 38 and upper portion 36 form body 28. Arm 38 extends from upper portion 36 and first fastener opening 56 extends through arm 38 between first side 40 and second side 42. First fastener opening 56 is configured to receive a fastener to secure an object to support bracket. First fastener opening includes diameter D1 and center C1.

Boss 34 (shown in FIG. 4A) extends from second side 42 of upper portion 36. Second fastener opening 64 extends through upper portion 36 and boss 34. Second fastener opening 64 has a diameter D2 and a center C2. Boss 34 extends from second side 42 and is configured to provide structural support at a connection between support bracket 14 and an LRU, such as forward manifold 26.

Second mount 32 is integral with upper portion 36 of body 28. Second mount 32 extends laterally and is connected to upper portion 36 opposite boss 34. First portion 50 of second mount 32 is shown. First portion 50 is offset from and connected to first side 40 of body 28. Third fillet 78 is disposed at an interface between first portion 50 and first side 40. Third fillet 78 provides structural support at the interface between first portion 50 and first side 40. Fifth fastener opening 70 extends through first portion 50 and is configured to receive a fastener. Fifth fastener opening includes D5 and C5.

Length L1 is a distance between center C1 and inner edge 86 of first portion 50. Length L2 is a distance between center C1 and center C5. Length L3 is a distance between center C1 and outer edge 96. Length L4 is a horizontal distance between center C1 and a point of connection between second angled edge 94 and first side edge 88. Length L5 is a distance between center C1 and first side edge 88 of first portion 50. Length L6 is a distance between center C1 and point of connection between third fillet 78 and first side 40. Length L7 is a horizontal distance between center C1 and center C2. Length L8 is a vertical distance between center C1 and center C2.

In the present embodiment, length L1 is about 3.100 centimeters (1.220 inches). Length L2 is about 5.243 centimeters (2.064 inches). Length L3 is about 6.579 centimeters (2.590 inches). Length L4 is about 5.245 centimeters (2.065 inches). Length L5 is about 9.284 centimeters (3.655 inches). Length L6 is about 8.649 centimeters (3.405 inches). Length L7 is about 2.946 centimeters (1.160 inches). Length L8 is about 11.430 centimeters (4.500 inches). While lengths have been described, it is understood that the lengths may vary within acceptable engineering tolerances, plus or minus 0.025 centimeters (0.010 inches) for example. It is also understood that the relationships between the various lengths are considered within the scope of the present invention. For example, support bracket 14 may be scaled to twice the preferred size and a ratio of L8 to L7 would remain about 3.9.

Figure 4A:
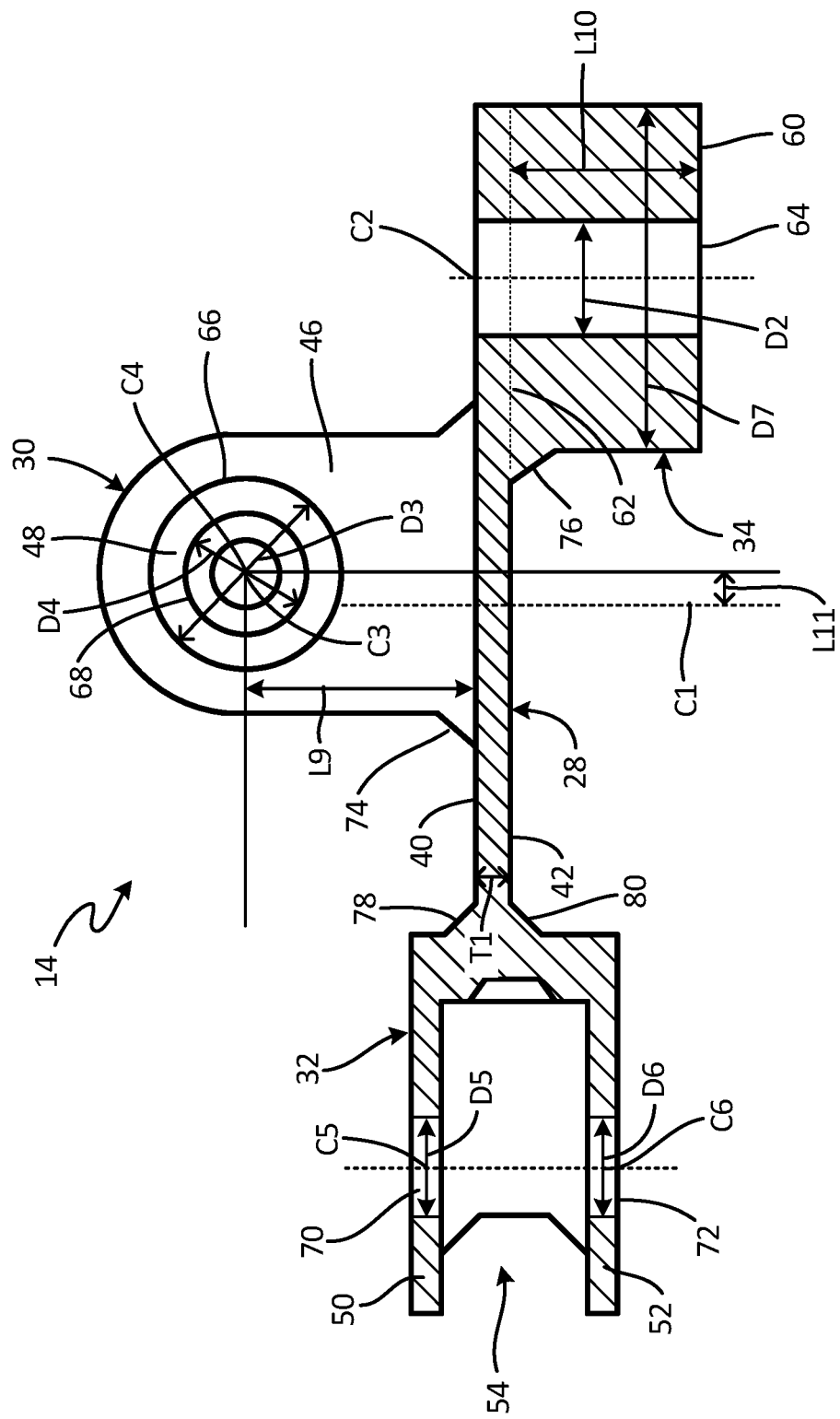
FIG. 4A is a cross-sectional view of the support bracket of FIG. 3 taken along line A-A in FIG. 3.
Figure 4B:
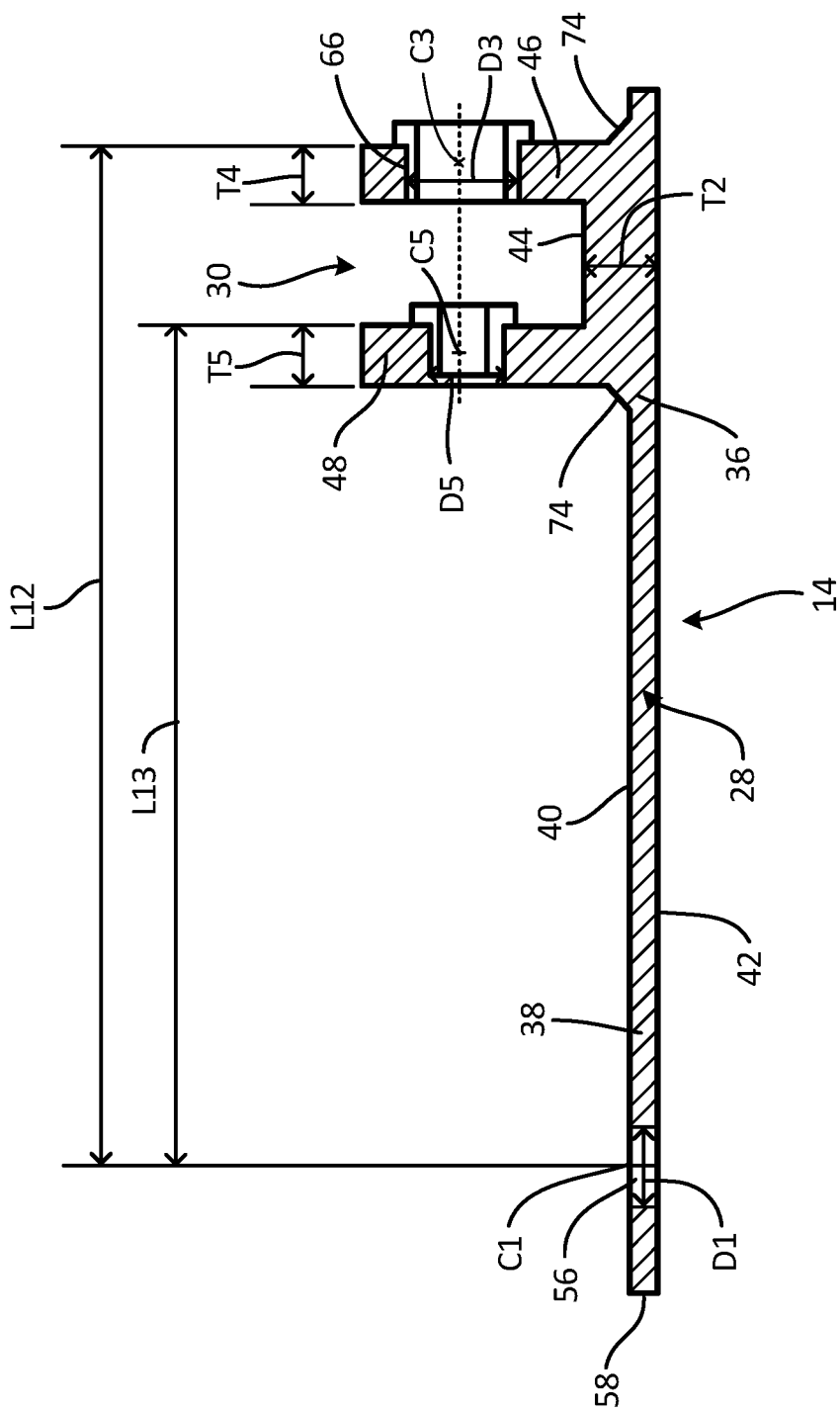
FIG. 4B is a cross-sectional view of the support bracket of FIG. 3 taken along line B-B in FIG. 3.
Figure 4C:
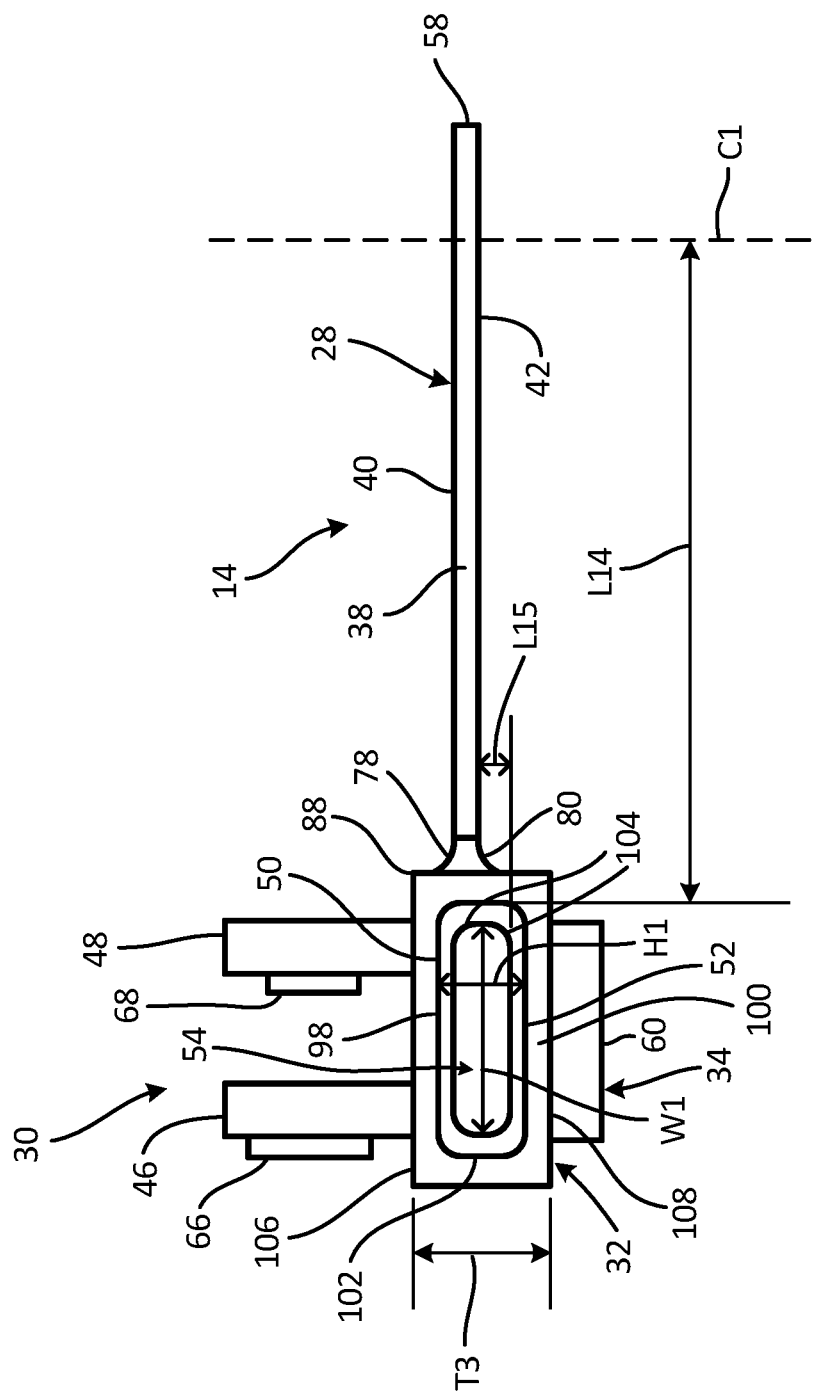
FIG. 4C is a side elevation view of the support bracket of FIG. 3.

FIG. 4A is a cross-sectional view of support bracket 14 taken along line A-A in FIG. 3. FIG. 4B is a cross-sectional view of support bracket 14 taken along line B-B in FIG. 3. FIG. 4C is a side elevation view of support bracket 14. FIGS. 4A, 4B, and 4C will be discussed together. Support bracket 14 includes body 28, first mount 30, second mount 32, boss 34, and thickness T1. Body 28 includes upper portion 36, arm 38, first side 40, and second side 42. Arm 38 includes first fastener opening 56, and first fastener opening 56 includes center C1 and diameter D1. Boss 34 includes first end 60, second end 62, and second fastener opening 64. Second fastener opening 64 includes center C2 and diameter D2. First mount 30 includes inner portion 44, first arm 46, second arm 48, and thickness T2. First arm 46 includes third fastener opening 66 and second arm 48 includes fourth fastener opening 68. Third fastener opening 66 includes diameter D3 and center C3. Fourth fastener opening 68 includes diameter D4 and center C4. Second mount 32 includes first portion 50 and second portion 52, and slot 54. Thickness T2 is a distance between inner portion 44 and second side 42 of body 28. Fifth fastener opening 70 extends through first portion 50, and fifth fastener opening 70 includes diameter D5 and center C5. Sixth fastener opening 72 extends through first portion 50 and sixth fastener opening 72 includes diameter D6 and center C6. Slot 54 includes upper edge 98, lower edge 100, first slot side 102, and second slot side 104. Slot 54 further includes height H1 between upper edge 98 and lower edge 100, and width W1 between first slot side 102 and second slot side 104. First portion 50 further includes first outer surface 106. Second portion 52 further includes second outer surface 108.

First mount 30 extends from first side 40 of body 28. First arm 46 and second arm 48 extend from inner portion 44 perpendicular to first side 40. First arm 46 extends parallel to second arm 48. Inner portion 44 extends from first side 40 of body 28. First fillet 74 is disposed at an interface between inner portion 44 and first side 40. Third fastener opening 66 extends through first arm 46 and fourth fastener opening 68 extends through second arm 48. First arm 46 and second arm 48 define a slot, and the slot is configured to receive a connecting rod.

Boss 34 is integral with upper portion 36 of body 28. Boss 34 extends from second side 42 or body 28. Second fastener opening 64 extends through upper portion 36 and boss 34 and is configured to receive a fastener to attach support bracket 14 to an LRU. Second fillet 76 is disposed at an interface between second end 62 of boss and second side 42 of support bracket 14. Second fillet 76 provides structural support to boss 34 and at the interface of boss 34 and second side 42.

Second mount 32 is integral with upper portion 36 of body 28 and is disposed opposite of boss 34 on upper portion 36. First portion 50 is integral with upper portion 36 and first portion 50 is offset from first side 40. Third fillet 78 is disposed at an interface between first portion 50 and first side 40. More specifically, third fillet 78 is disposed between inner edge 86 and first side 40 and between first side edge 88 and first side 40. Second portion 52 is similarly offset from second side 42 and is integral with upper portion 36. Fourth fillet 80 is disposed at an interface between second portion 52 and second side 42. Slot 54 is disposed between and defined by first portion 50 and second portion 52. Second mount 32 includes a thickness T3 between an outer surface of first portion 50 and an outer surface of second portion 52.

Upper edge 98 of slot 54 is the inner edge of first portion 50 of second mount 32. Similarly, lower edge 100 of slot 54 is the inner edge of second portion 52 of second mount 32. Height H1 of slot 54 is between upper edge 98 and lower edge 100. First slot side 102 and second slot side 104 form edges of slot 54 and partially enclose slot 54. Width W1 of slot 54 is between first slot side 102 and second slot side 104.

A radius of first fillet 74 is between 0.452 centimeters (0.178 inches) and 0.503 centimeters (0.198 inches). A radius of second fillet 76 is between 0.452 centimeters (0.178 inches) and 0.503 centimeters (0.198 inches). A radius of third fillet 78 is between 0.452 centimeters (0.178 inches) and 0.503 centimeters (0.198 inches). A radius of fourth fillet 80 is between 0.452 centimeters (0.178 inches) and 0.503 centimeters (0.198 inches). Thickness T1 is between 0.305 centimeters (0.120 inches) and 0.330 centimeters (0.130 inches). Thickness T2 is between 0.825 centimeters (0.325 inches) and 0.877 centimeters (0.345 inches). Thickness T3 is between 1.803 centimeters (0.710 inches) and 1.855 centimeters (0.730 inches). A ratio of thickness T3 to the radius of third fillet 78 is between 4.11 and 3.57. A ratio of thickness T2 to the radius of first fillet 74 is between 1.94 and 1.64. While fillet radii and thicknesses have been described, the relationships between the various fillet radii and thicknesses are within the scope of the present disclosure. For example, support bracket 14 may be scaled to three times the preferred size and a ratio of thickness T3 to the radius of third fillet 78 will remain between about 4.11 and about 3.57.

Referring specifically to FIG. 4A, third fastener opening 66 and fourth fastener opening 68 are aligned such that center C3 and center C4 lie on the same horizontal plane. Length L9 is a distance between center C3 and second side 42. Length L10 is a distance between first end 60 of boss 34 and second side 42. Length L11 is a horizontal distance, with regard to first side 40 of body 28, that center C3 is offset from center C1 of first fastener opening 56. Diameter D7 is an outer diameter of second end 62 of boss 34.

Length L9 is about 2.390 centimeters (0.941 inches). Length L10 is about 1.715 centimeters (0.675 inches). Length L11 is about 0.224 centimeters (0.088 inches). Diameter D7 is about 3.175 centimeters (1.250 inches). While lengths and diameters are described, it is understood that the lengths may vary within acceptable engineering tolerances, plus or minus 0.025 centimeters (0.010 inches) for example.

Referring specifically to FIG. 4B, thickness T2 is between inner portion 44 and second side 42. Length L12 is a distance between center C1 and an outer edge of first arm 46. Length L13 is a distance between center C1 and an inner edge of second arm 48. First arm 46 has a thickness T4 and second arm 48 has a thickness T5. Diameter D3 is larger than diameter D4. Diameter D3 is between about 1.427 centimeters (0.562 inches) and 1.433 centimeters (0.564 inches). Diameter D4 is between about 0.950 centimeters (0.374 inches) and 0.955 centimeters (0.376 inches).

In the present embodiment, thickness T2 is between 0.825 centimeters (0.325 inches) and 0.877 centimeters (0.345 inches). Length L12 is between about 12.212 centimeters (4.808 inches) and 12.238 centimeters (4.818 inches). Length L13 is between about 10.607 centimeters (4.176 inches) and about 10.632 centimeters (4.186 inches). Thickness T4 is between about 0.686 centimeters (0.270 inches) and 0.711 centimeters (0.280 inches). Thickness T5 is between about 0.660 centimeters (0.260 inches) and 0.686 centimeters (0.270 inches). A radius of the first fillet 74 is between about 0.452 centimeters (0.178 inches) and 0.503 centimeters (0.198 inches). A ratio of thickness T2 to the radius of the first fillet 74 is between 1.94 and 1.64.

Referring specifically to FIG. 4C, a length L14 is a distance between center C1 and first slot side 102. A length L15 is a distance between second side 42 and lower edge 100 of slot 54. Thickness T3 is a thickness of second mount 32 between first portion 50 and second portion 52. In the present embodiment, length L14 is about 9.652 centimeters (3.800 inches). Length L15 is about 0.699 centimeters (0.275 inches). Width W1 is about 3.556 centimeters (1.400 inches). While lengths have been described, it is understood that the lengths may vary within acceptable engineering tolerances, plus or minus 0.025 centimeters (0.010 inches) for example. Thickness T3 is between about 1.803 centimeters (0.710 inches) and about 1.855 centimeters (0.730 inches). Height H1 of slot 54 is between about 1.275 centimeters (0.502 inches) and about 1.300 centimeters (0.512 inches).

A ratio of thickness T3 to the radius of third fillet 78 is between 4.11 and 3.57. A ratio of thickness T3 to the radius of fourth fillet 80 is between 4.11 and 3.57. While various lengths, thicknesses, and radii have been described, the relationships between the various values are within the scope of the present invention. For example, support bracket 14 may be scaled to two times the preferred size and a ratio of thickness T3 to a radius of third fillet 78 would remain between 4.11 and 3.57.

The radius of first fillet 74, the radius of second fillet 76, the radius of third fillet 78, and the radius of fourth fillet 80 ensure that support bracket 14 has adequate structural integrity to interconnect and support heat exchanger 22, CAC 20, forward manifold 26, and three-way lower mount 24. In addition, the ratio of thickness T2 to the radius of first fillet 74 and the ratio of thickness T3 to the radius of third fillet 78 are sized such that support bracket provides adequate support to the various LRUs. The ratios of thickness to fillet radius further ensure that support bracket 14 has sufficient structural integrity to interconnect and support various components of environmental control system 12. The ratios are also configured such that support bracket 14 may be scaled relative to the preferred size. The ratios also ensure that support bracket 14 is sufficiently lightweight such that support bracket 14 does not have an adverse weight impact on the aircraft.

The relationship of first mount 30 and second mount 32 allows support bracket 10 to connect and support multiple components with a single bracket. The arrangement of first mount 30, second mount 32, and boss 34, ensures adequate support and the proper spatial arrangement of the multiple components. Moreover, first fillet 74, second fillet 76, third fillet 78, and fourth fillet 80 provide structural support to support bracket 14 and eliminate the need for additional structural elements to support the various connections of support bracket 14. Eliminating the need for additional structural elements reduces the weight and footprint of support bracket 14.

Discussion of Possible Embodiments

The following are non-exclusive descriptions of possible embodiments of the present invention.

A support bracket includes a bracket body, a first mount, a boss, and a second mount. The bracket body includes a first side, a second side, a thickness T1 between the first side and the second side, an upper portion, and an arm extending laterally from the upper portion. The first mount extends perpendicularly from the first side and the upper portion. A first fillet is disposed at an interface of the first mount and the upper portion. The boss is extends from the second side and the upper portion. A second fillet disposed at an interface of the boss and the second side. The second mount extends laterally into the upper portion. A third fillet is disposed at an interface of the second mount and the first side. A fourth fillet is disposed at an interface of the second mount and the second side.

The support bracket of the preceding paragraph can optionally include, additionally and/or alternatively, any one or more of the following features, configurations and/or additional components:

A radius of the third fillet is between 0.452 centimeters (0.178 inches) and 0.503 centimeters (0.198 inches).

The second mount includes a first portion extending from the first side, the first portion including a first outer surface, a second portion extending from the second side, the second portion including a second outer surface, a slot defined between the first portion and the second portion, and a thickness T3 between the first outer surface and the second outer surface.

The thickness T3 is between 1.803 centimeters (0.710 inches) and 1.855 centimeters (0.730 inches).

A ratio of the thickness T1 to a radius of the third fillet is between 4.11 and 3.57.

A radius of the first fillet is between 0.452 centimeters (0.178 inches) and 0.503 centimeters (0.198 inches).

The first mount includes an inner portion, a first arm extending from the inner portion, the first arm extending perpendicular to the first side, a second arm extending from the inner portion, the second arm perpendicular to the first side, and a thickness T2 between the inner surface and the second side.

The thickness T2 is between 0.825 centimeters (0.325 inches) and 0.877 centimeters (0.345 inches).

A ratio of the thickness T2 to a radius of the first fillet 74 is between 1.94 and 1.64.

A radius of the second fillet is between 0.452 centimeters (0.178 inches) and 0.503 centimeters (0.198 inches).

A support system includes a support bracket, a cabin air compressor, a heat exchanger, a backbone mount, and a forward manifold. The support bracket includes a bracket body, the bracket body including a first side, a second side, a thickness T1 between the first side and the second side, an upper portion, and an arm extending laterally from the upper portion, wherein the arm includes a first fastener opening. The support bracket further includes a first mount extending from the first side and the upper portion, a first fillet disposed at an interface of the first mount and the upper portion, a boss extending from the second side and the upper portion, the boss including a second fastener opening extending through the boss, a second fillet disposed at an interface of the boss and the second side, a second mount extending laterally into the upper portion, the second mount including a slot extending into the upper portion, a third fillet disposed at an interface of the second mount and the first side, and a fourth fillet disposed at an interface of the second mount and the second side. A first tie-rod is attached to the cabin air compressor and secured within the first mount. A second tie-rod attached to the heat exchanger and secured within the slot of the second mount. A first fastener extends through the first fastener opening and into a backbone mount. A second fastener extending through the second fastener opening and into the forward manifold.

The support system of the preceding paragraph can optionally include, additionally and/or alternatively, any one or more of the following features, configurations and/or additional components:

The second mount includes a first portion extending from the first side, the first portion including a first outer surface, a second portion extending from the second side, the second portion including a second outer surface, a thickness T3 between the first outer surface and the second outer surface, and a slot defined between the first portion and the second portion and extending laterally into the bracket body.

A radius of the third fillet is between 0.452 centimeters (0.178 inches) and 0.503 centimeters (0.198 inches).

A ratio of the thickness T3 to a radius of the third fillet is between 4.11 and 3.57.

The first mount includes an inner portion extending from the first side, a first arm extending from the inner portion, the first arm extending perpendicular to the first side, a second arm extending from the inner portion, the second arm perpendicular to the first side, and a thickness T2 between the inner portion and the second side.

A ratio of the thickness T2 to a radius of the first fillet is between 1.94 and 1.64.

The first arm includes a third fastener opening and the second arm includes a fourth fastener opening, wherein a third fastener extends through the third fastener opening, the first tie-rod, and the fourth fastener opening.

A diameter of the third fastener opening is larger than a diameter of the fourth fastener opening.

A radius of the first fillet is between 0.452 centimeters (0.178 inches) and 0.503 centimeters (0.198 inches).

A radius of the second fillet is between 0.452 centimeters (0.178 inches) and 0.503 centimeters (0.198 inches).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A support bracket comprising:
 a bracket body, the bracket body comprising:
  a first side, a second side, a thickness T1 between the first side and the second side, an upper portion, and an arm extending laterally from the upper portion;
 a first mount extending perpendicularly from the first side and the upper portion;
 a first fillet disposed at an interface of the first mount and the first side;
 a boss extending from the second side and the upper portion;
 a second fillet disposed at an interface of the boss and the second side;
 a second mount extending laterally into the upper portion;
 a third fillet disposed at an interface of the second mount and the first side; and
 a fourth fillet disposed at an interface of the second mount and the second side.

2. The support bracket of claim 1, wherein a radius of the third fillet is between 0.452 centimeters (0.178 inches) and 0.503 centimeters (0.198 inches).

3. The support bracket of claim 1, wherein the second mount further comprises:
 a first portion extending from the first side, the first portion including a first outer surface;
 a second portion extending from the second side, the second portion including a second outer surface;
 a slot defined between the first portion and the second portion; and
 a thickness T3 between the first outer surface and the second outer surface.

4. The support bracket of claim 3, wherein the thickness T3 is between 1.803 centimeters (0.710 inches) and 1.855 centimeters (0.730 inches).

5. The support bracket of claim 3, wherein a ratio of the thickness T1 to a radius of the third fillet is between 4.11 and 3.57.

6. The support bracket of claim 1, wherein a radius of the first fillet is between 0.452 centimeters (0.178 inches) and 0.503 centimeters (0.198 inches).

7. The support bracket of claim 1, wherein the first mount further comprises:
 an inner portion;
 a first arm extending from the inner portion, the first arm extending perpendicular to the first side;
 a second arm extending from the inner portion, the second arm extending perpendicular to the first side; and
 a thickness T2 between the inner portion and the second side.

8. The support bracket of claim 7, wherein the thickness T2 is between 0.825 centimeters (0.325 inches) and 0.877 centimeters (0.345 inches).

9. The support bracket of claim 7, wherein a ratio of the thickness T2 to a radius of the first fillet is between 1.94 and 1.64.

10. The support bracket of claim 1, wherein a radius of the second fillet is between 0.452 centimeters (0.178 inches) and 0.503 centimeters (0.198 inches).

11. A support system for a cabin air compressor and temperature control system, the support system comprising:
 a support bracket comprising:
  a bracket body, the bracket body comprising:
   a first side, a second side, a thickness T1 between the first side and the second side, an upper portion, and an arm extending laterally from the upper portion, wherein the arm includes a first fastener opening;
  a first mount extending from the first side and the upper portion;
  a first fillet disposed at an interface of the first mount and the first side;
  a boss extending from the second side and the upper portion, the boss including a second fastener opening extending through the boss;
  a second fillet disposed at an interface of the boss and the second side;
  a second mount extending laterally into the upper portion, the second mount including a slot;
  a third fillet disposed at an interface of the second mount and the first side; and
  a fourth fillet disposed at an interface of the second mount and the second side;
 a first tie-rod attached to a cabin air compressor and secured within the first mount;
 a second tie-rod attached to a heat exchanger and secured within the slot of the second mount;
 a first fastener extending through the first fastener opening and into a backbone mount; and
 a second fastener extending through the second fastener opening and into a forward manifold.

12. The system of claim 11, wherein the second mount further comprises:
 a first portion extending from the first side, the first portion including a first outer surface;
 a second portion extending from the second side, the second portion including a second outer surface; and
 a thickness T3 between the first outer surface and the second outer surface;
 wherein the slot is defined between the first portion and the second portion, and wherein the slot extends laterally into the bracket body.

13. The system of claim 11, wherein a radius of the third fillet is between 0.452 centimeters (0.178 inches) and 0.503 centimeters (0.198 inches).

14. The system of claim 11, wherein a ratio of the thickness T3 to a radius of the third fillet is between 4.11 and 3.57.

15. The system of claim 11, wherein the first mount further comprises:
 an inner portion extending from the first side;
 a first arm extending from the inner portion, the first arm extending perpendicular to the first side;
 a second arm extending from the inner portion, the second arm extending parallel to the first arm; and
 a thickness T2 between the inner portion and the second side.

16. The system of claim 15, wherein a ratio of the thickness T2 to a radius of the first fillet is between 1.94 and 1.64.

17. The system of claim 15 wherein the first arm includes a third fastener opening and the second arm includes a fourth fastener opening, wherein a third fastener extends through the third fastener opening, the first tie-rod, and the fourth fastener opening.

18. The system of claim 17, wherein a diameter of the third fastener opening is larger than a diameter of the fourth fastener opening.

19. The system of claim 11, wherein a radius of the first fillet is between 0.452 centimeters (0.178 inches) and 0.503 centimeters (0.198 inches).

20. The support bracket of claim 11, wherein a radius of the second fillet is between 0.452 centimeters (0.178 inches) and 0.503 centimeters (0.198 inches).

* * * * *